United States Patent
Kim

(10) Patent No.: US 6,989,867 B2
(45) Date of Patent: Jan. 24, 2006

(54) CCD CAMERA DAYTIME/NIGHTTIME CONTROL

(75) Inventor: Sung Bong Kim, Pyeongtaek (KR)

(73) Assignee: LG Electronics Inc., Seoul (KR)

( * ) Notice: Subject to any disclaimer, the term of this patent is extended or adjusted under 35 U.S.C. 154(b) by 535 days.

(21) Appl. No.: 09/899,083

(22) Filed: Jul. 6, 2001

(65) Prior Publication Data

US 2002/0006284 A1 Jan. 17, 2002

(30) Foreign Application Priority Data

Jul. 6, 2000 (KR) ................................ 2000-38492

(51) Int. Cl.
*H04N 5/238* (2006.01)
(52) U.S. Cl. .................... 348/362; 348/216.1; 348/342
(58) Field of Classification Search ................ 348/351, 348/216.1, 345, 221.1, 362–366, 143, 150–156, 348/342, 222.1, 294, 262, 302, 311, 355
See application file for complete search history.

(56) References Cited

U.S. PATENT DOCUMENTS

| | | | | |
|---|---|---|---|---|
| 5,038,216 A | * | 8/1991 | Easterly et al. | 348/364 |
| 5,172,220 A | * | 12/1992 | Beis | 348/262 |
| 6,342,922 B1 | * | 1/2002 | Mizoguchi | 348/355 |

* cited by examiner

*Primary Examiner*—David L. Ometz
*Assistant Examiner*—Brian Jelinek
(74) *Attorney, Agent, or Firm*—Birch, Stewart, Kolasch & Birch, LLP

(57) ABSTRACT

A controlling method for a CCD camera in which a photographing area is divided into a number of cell regions, the illumination of each cell regions is detected, and the photographing mode of a camera is switched to a daytime or nighttime mode on the basis of the detected illumination so that an optimum image is photographed, even under conditions where the illumination of a certain position and the total illumination condition of what is photographed changes irregularly.

22 Claims, 5 Drawing Sheets

CCD CAMERA DAYTIME/NIGHTTIME CONTROL

BACKGROUND OF THE INVENTION

1. Field of the Invention

The present invention relates to a CCD (charge-coupled device) camera and particularly to a method for controlling a CCD camera which enables a CCD camera to photograph a vivid image by determining the illumination condition of a space in case of photographing a space whose illumination condition changes irregularly.

2. Description of the Background Art

Recently, as demand for digital imaging apparatus spreads, light miniature cameras are coming on the market. As an imaging sensor for such cameras, a CCD is widely used.

Most cameras have a function of automatic exposure setting or automatic aperture setting (Iris) and accordingly, are capable of photographing in the daytime and nighttime. Namely, the camera measures the illumination of the scene and in case the illumination is low, it controls the degree of exposure during imaging so that the image captured has a proper brightness. On the other hand, in case of controlling the exposure amount of an image by controlling the iris of a camera, it is difficult because the physical amount that the iris can be opened is limited, and in case the available illumination is insufficient photographing is enabled by switching the photographing mode and photographing with use of a subsidiary source of light. On the other hand, in case a subsidiary source of light is not available, the photographing operation is performed by changing the lens of a camera to one capable of photographing in the infrared ray range. Here, the case that the illumination is high means the visible ray range and photographing an image in the visible ray range means the daytime mode. Photographing the image in the infrared ray range means the nighttime mode.

Generally, the camera uses, as shown in FIG. 1, an OLPF (optical low pass filter) so as to photograph an image similarly to the sight of a person by intercepting the infrared rays on the condition of daytime mode.

FIG. 1 is a graph showing the spectral frequency characteristic of an optical low pass filter according to the conventional. The range lower than 700 nm is a visible ray range and the range higher than 700 nm is an infrared ray range. Namely, when the conversion mode of the camera is switched to a nighttime mode, the OLPF should be removed mechanically or a lens which contains the OLPF should removed manually or replaced by a dummy filter which does not have a function of absorbing infrared rays so as to photograph the image brighter. A conventional camera, as shown in FIGS. 2~4, uses a method which determines the illumination condition by measuring the brightness of a central photographing area.

FIG. 2 illustrates a conventional photometry method. Namely, FIG. 2 shows a method in which the camera measures the illumination of a spot of an area to be photographed by a spot photometry method.

FIG. 3 illustrates another conventional photometry method. Namely, FIG. 3 shows a method for supplementing the method in which the camera measures the illumination of a spot of an area to be photographed with a spot photometry method, by measuring the illumination within an area while placing less weight on the outer portion than on the center so as to have a form of a concentric target.

FIG. 4 illustrates a further conventional photometry method. Namely, FIG. 4 shows a method for supplementing the method in which the camera measures the illumination as described above. In case of photographing a certain space, the area where the image is placed is divided into several portions, the weight of the center portion is set to be the highest while placing less weight on the outer portions as in the order of the left, right, up and down, and then the illumination is measured by obtaining the average weight from the above.

The above methods are capable of photographing an image vividly when the subjects to be photographed are all located within the central part of the photographing area, and have been implemented for a digital camcorder, personal computer camera, and a digital still camera.

On the other hand, recently, a camera is widely used for surveillance in buildings or parking lots as well as for photographing of certain subjects. Namely, in case of installing a surveillance camera in a parking lot or garage, the brightness inside the parking lot may be quite dark. Moreover, an irregular change of illumination inside the parking lot is generated as cars come in and out. With the conventional photometry method, a vivid image could not be obtained. Here, the change of illumination in the parking lot is generated by the reflection of external light into the parking lot by a certain portion of the car when the car enters a parking lot in the daytime or by the headlights of a car when the car enters the parking lot at night.

Namely, the conventional photometry methods have a disadvantage in that a certain space can not be photographed reliably, such as due to the irregularly changing illumination inside a parking lot when using such methods.

SUMMARY OF THE INVENTION

Therefore, it is an object of the present invention to provide a method for a CCD camera which enables photographing an optimum image despite irregularly changing illumination conditions, by switching a photographing mode of a camera into day or nighttime modes by dividing the photographing area into a plurality of cell regions and comparing the average illumination of the cell regions to a standard illumination value.

To achieve the above object, the controlling method for a CCD camera in accordance with the present invention includes the steps of dividing a photographing region into a plurality of cell regions and detecting the illumination value of the cell regions; determining whether the illumination value of each cell region is higher than a previously stored standard illumination value, counting the number of the cell regions having a lower illumination value than the standard illumination value, determining whether the counted number is higher than a certain percentage of total number of cell regions, and switching the photographing mode of the camera on the basis of the determination.

The foregoing and other objects, features, aspects and advantages of the present invention will become more apparent from the following detailed description of the present invention when taken in conjunction with the accompanying drawings

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Hereinafter, the process of switching the photographing mode of a camera by measuring the irregularly changing illumination in a certain space in accordance with the present invention will be described in detail with reference to FIGS. 5~7.

Figure 1:
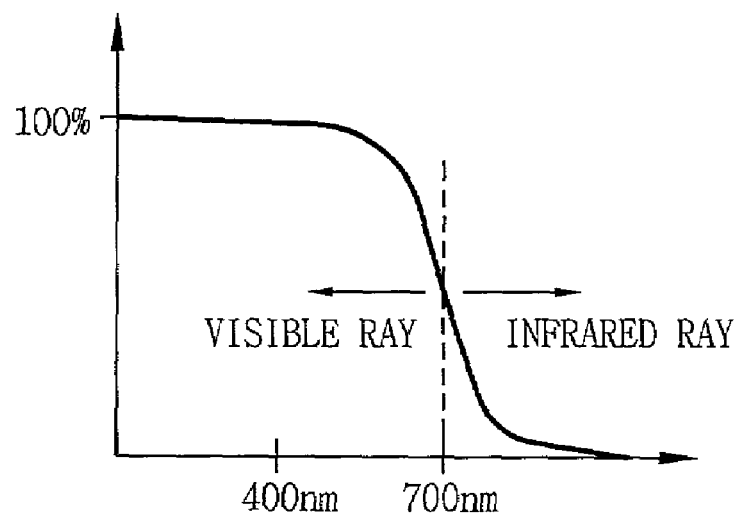
FIG. 1 is a graph showing the characteristic of an optical low pass filter according to the conventional art.
Figure 2:
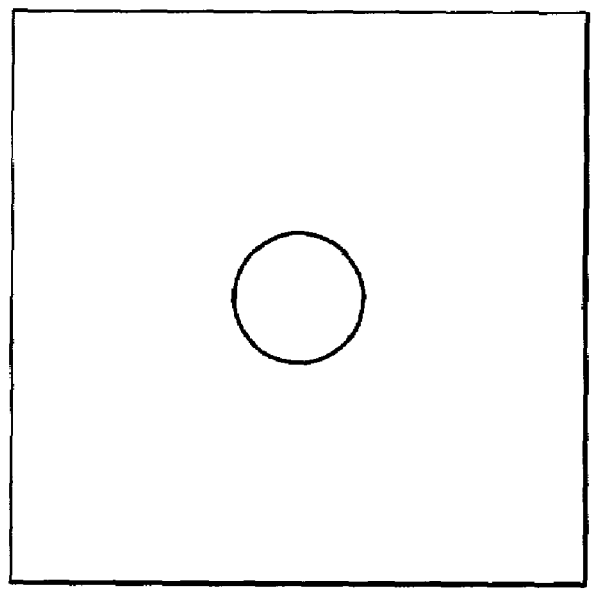
FIG. 2 is an illustration of a conventional spot photometry method.
Figure 3:
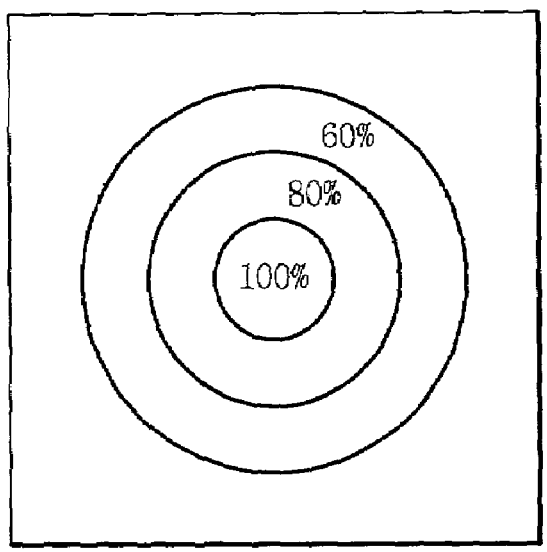
FIG. 3 is an illustration of a conventional center weighted spot photometry method.
Figure 4:
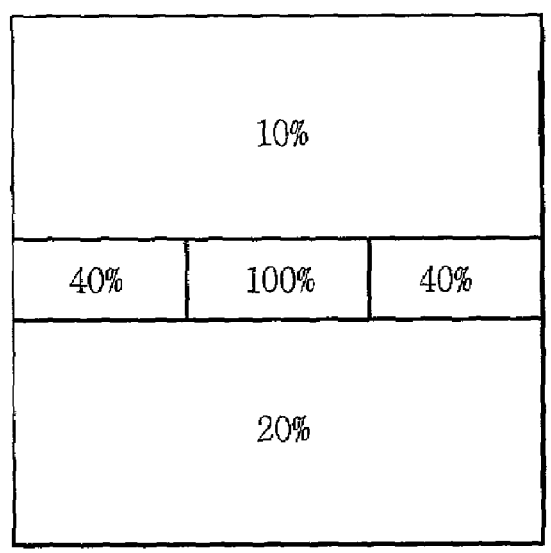
FIG. 4 is an illustration of a conventional weighted zone photometry method.
Figure 5:
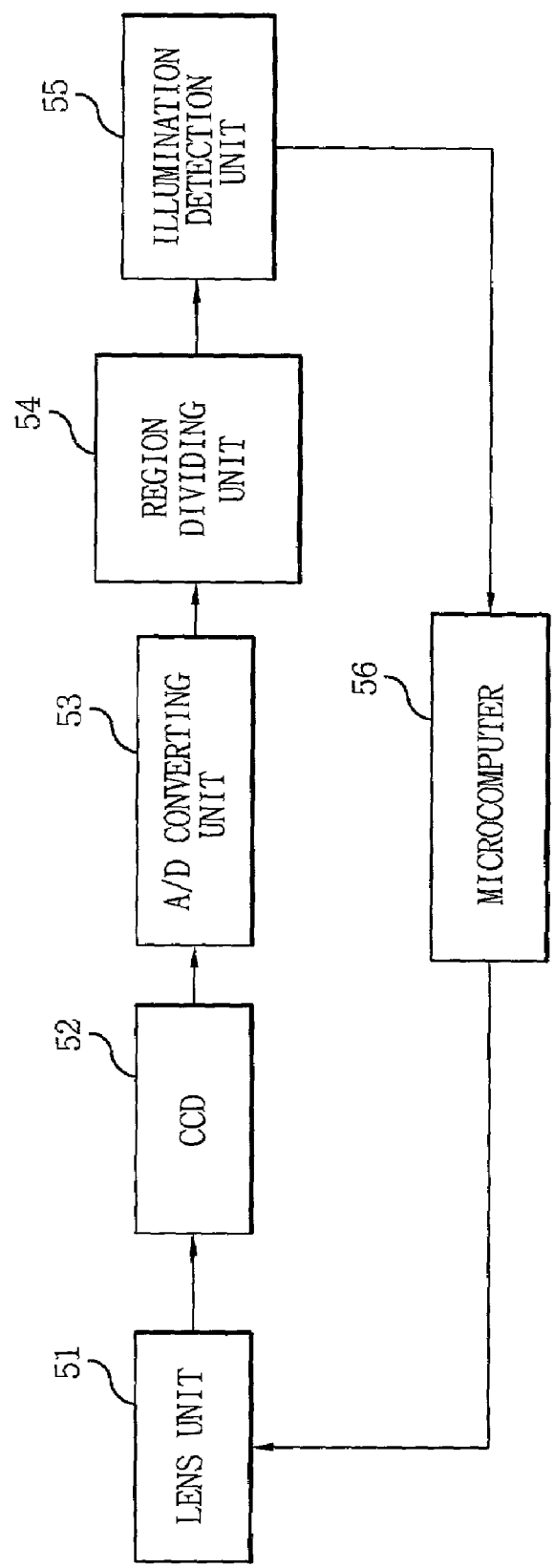
FIG. 5 is a schematic block diagram of a CCD camera to which the control method according to the present invention is applied.

FIG. 5 is a schematic block diagram showing the apparatus to which is applied the present method of switching the photographing mode of a camera by measuring the illumination, which changes irregularly.

As shown in FIG. 5, the apparatus is composed of a lens unit 51 focusing and magnifying an image, a charge coupled device (CCD) 52 sensing the intensity of radiation composing the image entered through the lens unit 51 and outputting an analog signal, a A/D converting unit 53 converting the analog signal outputted from the CCD 52 into digital image data, a region dividing unit 54 dividing the digital image data into a certain number of cell regions, an illumination detection unit 55 detecting the illumination of the divided regions and a microcomputer 56 controlling the lens unit and switching the photographing mode of the camera into the daytime or nighttime mode on the basis of the detected illumination and previously stored standard illumination value. The operation of the apparatus which switches the photographing mode of the camera in accordance with the present invention will be explained with reference to FIGS. 6 and 7.

Figure 6:
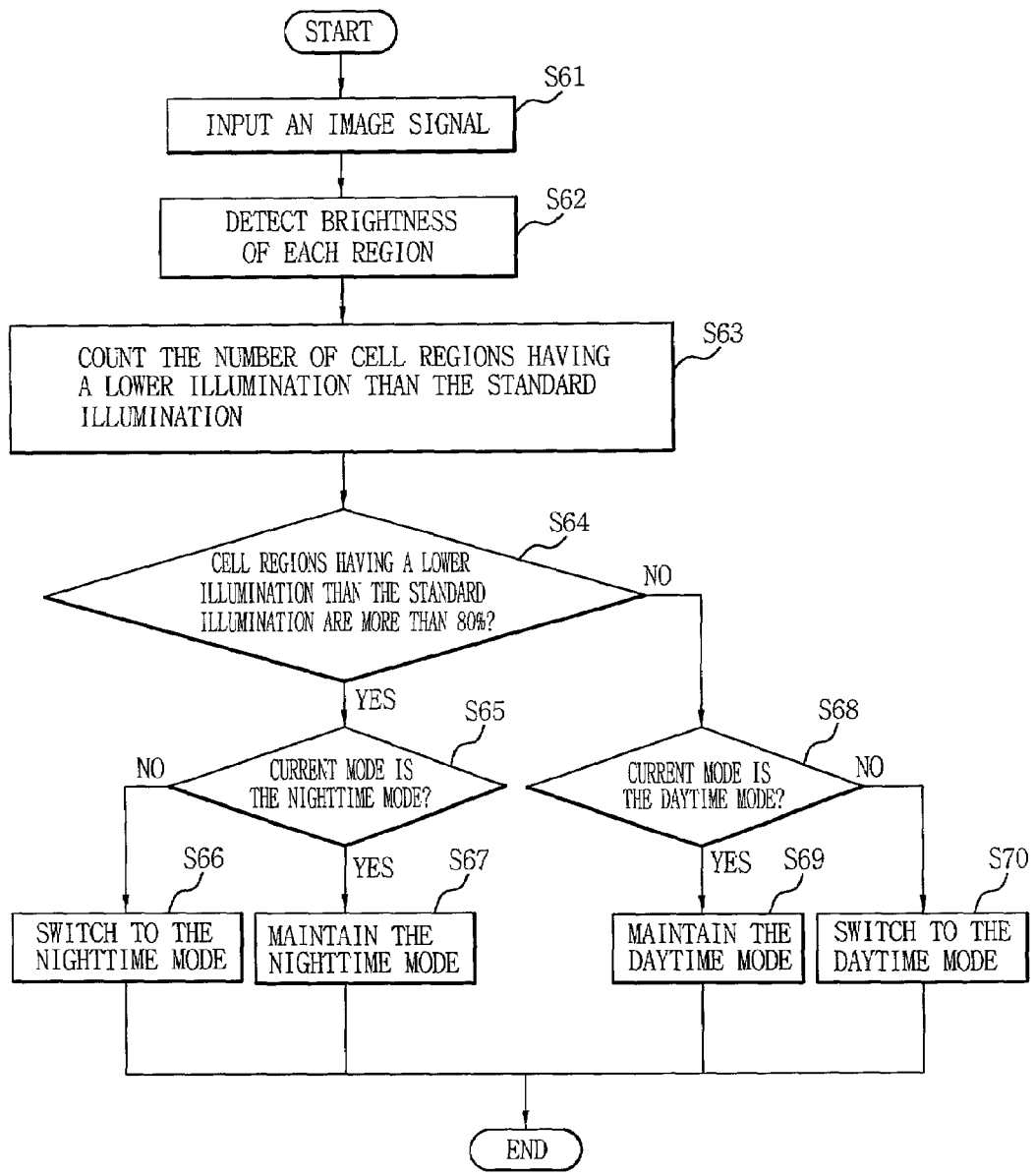
FIG. 6 is a flow chart showing the process of switching the photographing mode of the camera by measuring the illumination which changes irregularly.

FIG. 6 is a flow chart showing the process of switching the photographing mode of the camera by measuring the illumination which changes irregularly. Namely, the flowchart illustrates the process of switching the photographing mode of the camera into the daytime orumination condition insuring the irregularly changing illumination in a certain space. The description of the process with reference to FIG. 6 is as follows. Hereinafter, the case that the illumination is high means the visible ray range and photographing an image in the visible ray range means the daytime mode. On the other hand, photographing the image in the infrared ray range means the nighttime mode.

Figure 7:
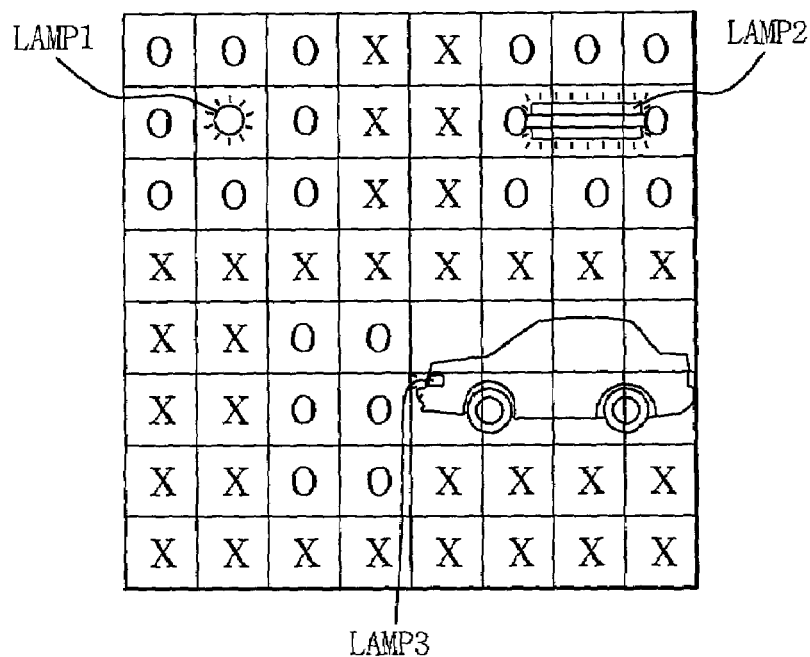
FIG. 7 is a view illustrating a photometry method in accordance with the present invention.

FIG. 7 is a diagram showing a photometry method in accordance with the present invention, namely, showing how a photographing region (a region in which an image is to be captured) is divided into a predetermined number of cell regions.

Firstly, the region dividing unit 54 divides the image data inputted from the A/D conversion unit 53 the of the photographing region into a certain number of cell regions at step S61. Here, the region-dividing unit 54 divides the cell region at regular intervals.

The illumination detection unit 55 detects the brightness illumination value of each of the cell regions divided by the region-dividing unit 54, at step S62.

Then the microcomputer 56 counts the number of cell regions having a lower illumination value than the previously stored standard illumination value among the detected cell regions, at step S63. Namely, the microcomputer determines whether the average illumination value is lower than the previously stored standard illumination value. At this time, referring to FIG. 7, the average illumination of the divided cell regions is measured uniformly regardless of the position. Here, the standard illumination is 3 lux or the illumination is 301RE. For example, the region receiving light directly from a lamp LAMP1, fluorescent lamp LAMP2 and headlight of a car LAMP3 has a higher illumination and as there are more cell regions for determining the average illumination, the image scene illumination can be measured more precisely.

The microcomputer 56 determines whether the number of the cell regions having a lower illumination value than the standard illumination value is greater than a predetermined percentage of all cell regions, at step S64. Here, as an example, the standard percentage is 80%.

In the determining step S64, when the number of the counted cell regions is larger than the standard percentage, the microcomputer 56 determines whether the photographing mode of the camera is the daytime mode or nighttime mode at step S65 The microcomputer 56 maintains the current photographing mode if the current mode is the nighttime mode at step S65 of determining the photographing mode of the camera at step S67.

On the other hand, the microcomputer 56 switches the photographing mode into the nighttime mode if the current mode is not the nighttime mode.

In the step S64, if more than the standard percentage of cell regions have a lower than standard illumination value, the microcomputer 56 determines whether the current mode is the daytime mode or the nighttime mode at step 68. In determining the photographing mode of the camera, via the flow of steps S64, S68 and S69, if the current mode is the daytime mode, the microcomputer 56 maintains the current photographing mode at step S69.

On the other hand, the microcomputer 56 switches the photographing mode of the camera to the daytime mode if the current mode is not the daytime mode at step S70.

Here, the meaning of switching the photographing mode of the camera is photographing the scene by using an OLPF in the lens unit or without using the OLPF. The lens unit is a lens assembly or lens module and includes a lens group.

On the other hand, if the camera being controlled by the method in accordance with the present invention is a manual camera on the condition that the photographing mode of the camera should be switched into the daytime or nighttime mode according to the irregularly changing illumination in a certain space, the user can remove the lens unit containing the OLPF or replace the lens with a dummy filter which is not capable of absorbing infrared rays by displaying a conversion message of the photographing mode of the camera to notify the user to switch modes.

On the other hand, in case the camera implementing the control method according to the present invention is an automatic camera, the scene received from the photographing area is passed through a lens unit of the camera which does or does not contain an OLPF, in accordance with the photographing mode conversion signals from the microprocessor.

As described above in detail, the controlling method for a CCD camera in accordance with the present invention has an effect of switching the photographing mode of a camera corresponding to an irregularly changing illumination in a certain space according to a daytime or nighttime mode without controlling the iris.

Also, the controlling method for a CCD camera in accordance with the present invention has an effect of switching the photographing mode into the daytime or nighttime mode by precisely in a certain space determining the illumination although it may change irregularly so as to photograph an optimum image.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds as are therefore intended to be embraced by the appended claims.

What is claimed is:

1. A method for controlling a CCD camera having a lens unit comprising the steps of:
    detecting illumination levels in a certain space to be photographed;
    generating digital image data corresponding to the detected illumination levels;
    dividing the digital image data into plural cell regions;
    comparing the detected illumination levels for each cell region to a previously determined standard illumination level; and
    switching a photographing mode of a camera to a daytime mode or a nighttime mode by either using an optical low pass filter (OLPF) in the lens unit or not using an optical low pass filter (OLPF) in the lens unit depending on the basis of the comparison result;
    wherein the step of switching the photographing mode of the camera comprises the sub-steps of:
    counting the number of cell regions having a detected illumination level less than the standard illumination level; and
    determining whether the thusly counted number of cell regions is greater than a certain percentage of the total number of cell regions.

2. The method of claim 1, wherein, in the comparing step, it is determined whether the illumination level of each cell region is higher than the standard illumination level.

3. The method of claim 1, wherein the photographing mode of the camera is switched to a nighttime mode in case the number of cell regions having a lower illumination level than the standard illumination level is greater than a certain percentage of the total number of cell regions.

4. The method of claim 1, wherein the photographing mode of the camera is switched to a daytime mode in case the number of cell regions having lower illumination level than the standard illumination level is less than a certain percentage of the total number of cell regions.

5. A method of controlling a photographing mode of a camera between a daytime mode and a nighttime mode having a lens unit, comprising the steps of:
    dividing a photographing area into a plurality of cell regions;
    detecting an illumination level of each cell region;
    counting the number of cell regions having a detected illumination level less than a standard illumination level;
    determining whether the thusly counted number of cell regions is greater than a certain percentage of the total number of cell regions; and
    switching the photographing mode of the camera between daytime mode and nighttime mode by either using an optical low pass filter (OLPF) in the lens unit or not using an optical low pass filter (OLPF) in the lens unit on the basis of determining whether the detected illumination level of each cell region is higher than a previously determined standard illumination level.

6. The method of claim 5, further comprising switching the photographing mode of the camera on the basis of determining whether the illumination level of each cell region is higher than a previously determined standard illumination level.

7. The method of claim 5, wherein the photographing mode of the camera is switched on the basis of comparing the detected illumination levels and the previously determined standard illumination level.

8. The method of claim 5, further comprising switching the photographing mode of the camera into a nighttime mode in case the number of cell regions having a lower illumination level than the previously determined standard illumination level is greater than a certain percentage of the total number of cell regions.

9. The method of claim 5, further comprising switching the photographing mode of the camera into a daytime mode in case the number of cell regions having lower illumination level than a previously stored standard illumination is less than a certain percentage of the total number of cell regions.

10. A method of controlling a photographing mode of a camera to a daytime mode or a nighttime mode and having a lens unit, comprising the steps of:
    dividing a photographing area into a plurality of cell regions and detecting an illumination level of each cell region;
    determining whether the detected illumination level of each cell region is greater than a previously determined standard illumination level;
    counting the number of the cell regions having a lower illumination level than the standard illumination level;
    determining whether the counted number is greater than a certain percentage of the total number of cell regions; and
    switching the photographing mode of the camera to daytime mode or nighttime mode by either using an optical low pass filter (OLPF) in the lens unit or not using an optical low pass filter (OLPF) in the lens unit depending on the basis of the determination.

11. The method of claim 10, further comprising switching the photographing mode of the camera to a nighttime mode in case the number of the cell regions having a lower illumination level than the standard illumination level is higher than the certain percentage.

12. The method of claim 10, further comprising switching the photographing mode of the camera to a daytime mode in case the number of the cell regions having a lower illumination than the standard illumination is lower than the certain percentage.

13. A method of controlling a photographing mode of a camera to a daytime mode or a nighttime mode and having a lens unit, comprising the steps of:

dividing a photographing area into a plurality of cell regions and detecting the illumination of each cell region;
determining whether the illumination of each cell region is greater than a previously determined standard illumination value;
counting the number of the cell regions having a lower illumination than the standard illumination value;
determining whether the counted number of cell regions is greater than a certain percentage of the total number of cell regions; and
switching the photographing mode of the camera to daytime mode or nighttime mode by either using an optical low pass filter (OLPF) in the lens unit or not using an optical low pass filter (OLPF) in the lens unit depending on the basis of the results of at least one of the determining steps.

14. The method of claim 13, wherein the cell regions divide the photographing area at regular intervals.

15. The method of claim 13, further comprising uniformly averaging the illumination of the cell regions regardless of the position of the cell regions.

16. The method of claim 13, further comprising selecting the nighttime mode in case the counted number is higher than the certain percentage.

17. The method of claim 13, wherein the photographing mode comprises a nighttime mode in which the camera does not use an optical low pass filter.

18. A CCD camera having a lens unit comprising:
means for detecting illumination levels in a certain space to be photographed;
means for generating digital image data corresponding to the detected illumination levels;
means for dividing the digital image data into plural cell regions;
means for determining the average detected illumination using the digital image data in the plurality of regions;
means for counting the number of cell regions having detected illumination level less than a standard illumination level;
means for determining whether the thusly counted number of cell regions is greater than a certain percentage of the total number of cell regions;
means for comparing the detected illumination levels for each cell region to a previously determined standard illumination level; and
means for switching a photographing mode of a camera to a daytime mode or a nighttime mode by either using an optical low pass filter (OLPF) in the lens unit or not using an optical low pass filter (OLPF) in the lens unit depending on the basis of the comparison result.

19. A camera having a daytime photographing mode and a nighttime photographing mode and a lens unit, comprising:
means for dividing a photographing area into a plurality of cell regions;
means for detecting an illumination level of each cell region;
means for counting the number of cell regions having detected illumination level less than a standard illumination level;
means for determining whether the thusly counted number of cell regions is greater than a certain percentage of the total number of cell regions; and
means for switching the photographing mode of the camera on the basis of the detected illumination levels; and
means for switching the photographing mode of the camera to a daytime mode or a nighttime mode by either using an optical low pass filter (OLPF) in the lens unit or not using an optical low pass filter (OLPF) in the lens unit depending on the basis of determining whether the illumination level of each cell region is higher than a previously determined standard illumination level.

20. A camera having a daytime photographing mode and a nighttime photographing mode and a lens unit, comprising:
means for dividing a photographing area into a plurality of cell regions and detecting the illumination of each cell region;
means for determining whether the illumination of each cell region is greater than a previously determined standard illumination value;
means for counting the number of the cell regions having a lower illumination than the standard illumination value;
means for determining whether the counted number of cell regions is greater than a certain percentage of the total number of cell regions; and
means for switching the photographing mode of the camera to a daytime mode or a nighttime mode by either using an optical low pass filter (OLPF) in the lens unit or not using an optical low pass filter (OLPF) in the lens unit depending on the basis of the determination.

21. The camera of claim 20, wherein the means for switching the photographing mode of the camera on the basis of the determination switches the photographing mode of the camera to the daytime mode to not use the optical low pass filter to photograph the scene if the counted number of cell regions having lower illumination than the standard illumination value is greater than the certain percentage of the total number of cells.

22. The camera of claim 20, wherein the means for switching the photographing mode of the camera on the basis of the determination switches the photographing mode of the camera to the nighttime mode to use the optical low pass filter to photograph the scene if the counted number of cell regions having lower illumination than the standard illumination value is less than the certain percentage of the total number of cells.

* * * * *